US010599023B2

(12) United States Patent
Tang et al.

(10) Patent No.: US 10,599,023 B2
(45) Date of Patent: Mar. 24, 2020

(54) PROJECTION EQUIPMENT

(71) Applicant: Qingdao Hisense Laser Display Co., Ltd., Qingdao, Shandong (CN)

(72) Inventors: Tiantian Tang, Shandong (CN); Naiwen Hou, Shandong (CN)

(73) Assignee: Qingdao Hisense Laser Display Co., Ltd., Qingdao, Shandong (CN)

( * ) Notice: Subject to any disclaimer, the term of this patent is extended or adjusted under 35 U.S.C. 154(b) by 0 days.

(21) Appl. No.: 16/023,225

(22) Filed: Jun. 29, 2018

(65) Prior Publication Data
US 2019/0179217 A1 Jun. 13, 2019

(30) Foreign Application Priority Data

Dec. 7, 2017 (CN) .......................... 2017 1 1286061
Dec. 7, 2017 (CN) .......................... 2017 1 1286515

(51) Int. Cl.
*G03B 21/16* (2006.01)
*G03B 21/00* (2006.01)
*G03B 21/14* (2006.01)

(52) U.S. Cl.
CPC .......... *G03B 21/16* (2013.01); *G03B 21/008* (2013.01); *G03B 21/145* (2013.01)

(58) Field of Classification Search
CPC ....... G03B 21/16; G03B 21/08; G03B 21/145
USPC ......................................................... 353/52
See application file for complete search history.

(56) References Cited

U.S. PATENT DOCUMENTS 7,660,124 B2 * 2/2010 Chen .................. H05K 7/20472
165/80.3
2003/0071975 A1 4/2003 Fujimori et al.
2008/0285120 A1 * 11/2008 Lo ......................... B81B 7/0077
359/361

FOREIGN PATENT DOCUMENTS

| CN | 1402081 A | 3/2003 |
|---|---|---|
| CN | 2606906 Y | 3/2004 |
| CN | 203858412 U | 10/2014 |
| CN | 108107567 A | 6/2018 |
| JP | H11-202405 | 7/1999 |

(Continued)

OTHER PUBLICATIONS

International Search Report dated Aug. 29, 2018 for PCT Application No. PCT/CN2018/092501, Chinese language only (10 pp.).

(Continued)

*Primary Examiner* — Jerry L Brooks
(74) *Attorney, Agent, or Firm* — Brinks Gilson & Lione

(57) ABSTRACT

A projection equipment may including a housing arranged with a first opening and a DMD circuit board arranged with a DMD chip on a side facing the housing, where the DMD chip is arranged with an operational region and a non-operational region. The non-operational region may be located in the periphery of the operational region, and the operational region may modulate a portion of a beam that passes through the first opening when the portion of the beam irradiates onto the operational region. A first heat dissipation member may be arranged between the DMD chip and the housing such that there is a space between the first heat dissipation member and the DMD chip. The first heat dissipation member may be arranged with a second opening which provides a passage for the portion of the beam, while blocking the other portion of the beam.

20 Claims, 7 Drawing Sheets

(56) References Cited

FOREIGN PATENT DOCUMENTS

| | | |
|---|---|---|
| JP | H 11-202405 A | 7/1999 |
| JP | 2005-128369 A | 5/2005 |
| JP | 2007-199279 A | 8/2007 |
| KR | 10-2006-0017292 | 2/2006 |
| KR | 10-2006-0017292 A | 2/2006 |
| KR | 10-2006-0018352 | 3/2006 |
| KR | 10-2006-0018352 A | 3/2006 |

OTHER PUBLICATIONS

Office Action dated Jun. 3, 2019 from the China Patent Office for Application No. 201711286515.2, Chinese language only (5 pp.).
Office Action dated Nov. 22, 2019 from the China Patent Office for Application No. 201711286061.9, Chinese language only (6 pp.).

\* cited by examiner

PROJECTION EQUIPMENT

CROSS-REFERENCE TO RELATED APPLICATIONS

This application claims priorities to Chinese Patent Application No. 201711286061.9, filed on Dec. 7, 2017, entitled "DIGITAL MICROMIRROR DEVICE ASSEMBLY AND OPTICAL DEVICE ASSEMBLY", and Chinese Patent Application No. 201711286515.2, filed on Dec. 7, 2017, entitled "DIGITAL MICROMIRROR DEVICE ASSEMBLY". Both of the aforementioned applications are hereby incorporated by reference in their entireties.

TECHNICAL FIELD

The present disclosure relates to imaging device technologies, and more particularly, to a projection equipment.

BACKGROUND

In a DLP (Digital Light Processing) projection device, a DMD (Digital Micromirror Device) chip is a core component of the projection equipment for modulating an illumination beam irradiated thereon according to an image signal, and delivering the modulated illumination beam into a lens assembly to accomplish the imaging. In the projection equipment, the illumination beam travels through a series of optical lenses to eventually arrive at the DMD chip which, in turn, modulate the illumination beam to create the final image.

The DMD chip includes on its surface thousands of micro reflection mirrors that are flipped according to a modulation driving signal in order to modulate illumination beam and reflect the modulated illumination beam into the lens to form the image. The chip has a small surface dimension, typically at a fraction of an inch, but is subject to illumination beam at very intensive power level of up to hundred watts or even higher. In addition, the micro reflection mirrors have to be flipped at frequencies corresponding to the frame rate of the image, consuming electrical power while accumulating heat. Meanwhile, a drive-control circuit corresponding to the DMD chip also generates heat after extended operation times, leading temperature rise in the operation environment of the DMD chip. It can be seen that both the DMD chip itself and its surrounding assemblies can cause heat accumulation, creating a hot operation environment. As an electronic element, the DMD chip can be negatively influenced by the high temperature in performance. Therefore, the DMD chip needs to be timely and efficiently dissipated of the heat during operation to ensure normal operation of elements therein and prolong its useful lifespan.

SUMMARY

The disclosure provides a projection equipment to improve the reliability of the optical device assembly in use.

The disclosure provides a projection equipment, including:
 a housing arranged with a first opening;
 a DMD circuit board arranged with a DMD chip on a side facing the housing, wherein the DMD chip is arranged with an operational region and a non-operational region, the non-operational region is located in the periphery of the operational region, and the operational region is configured to modulate a portion of a beam that passes through the first opening, wherein the portion of the beam irradiates onto the operational region;
 a first heat dissipation member arranged between the DMD chip and the housing and with a spacing between the first heat dissipation member and the DMD chip, wherein the first heat dissipation member is arranged with a second opening which is configured to provide a passage for the portion of the beam that passes through the first opening and irradiates onto the operational region, while blocking other portion of the beam that passes through the first opening.

REFERENCE NUMERALS

Figure 1:
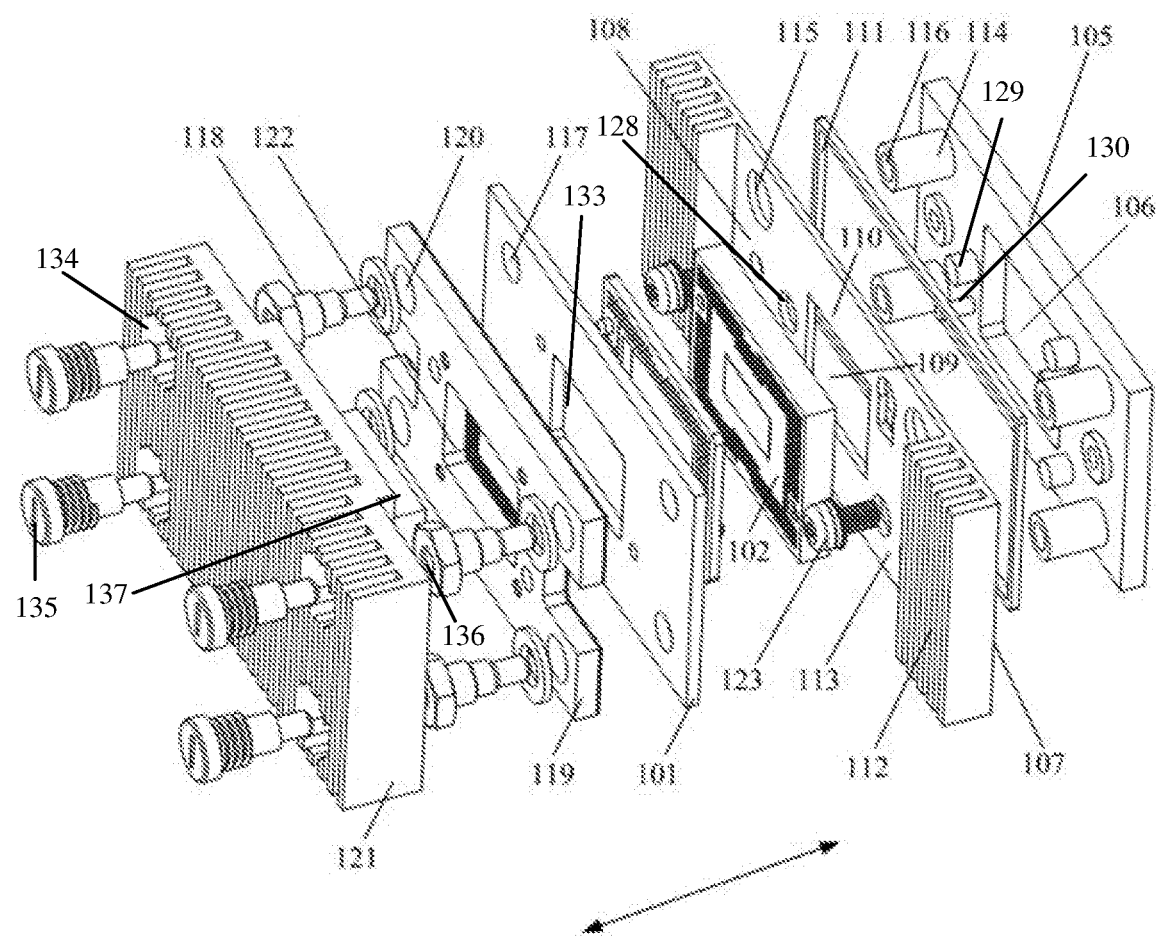
FIG. 1 is a structural exploded view of a projection equipment provided in some embodiments of this disclosure.

101: DMD circuit board;
102: DMD chip;
103: Operational region;
104: Non-operational region;
105: Housing;
106: First opening;
107: First heat dissipation member;
108: Main body portion;
109: Second opening;
110: Blocking portion;
111: Heat insulation member;
112: Heat dissipation portion;
113: Accommodation portion;
114: Second support strut;
115: Third through-hole;
116: First bolt hole;
117: Fourth through-hole;
118: First connection bolt;
119: Connection plate;
120: Fifth through-hole;
121: Second heat dissipation member;
122: Seventh through-hole;
123: Fastening bolt;
124: Black metallic region;
125: Window region;
126: Epoxy adhesive enclosure region;
127: Base pad region;
128: First through-hole;
129: First strut;
130: Locater strut;
131: Second through-hole;

132: Locater strut receiving groove;
133: Eighth through-hole;
134: Sixth through-hole;
135: Second connection bolt;
136: Second bolt hole;
137: Heat conduction block.

DETAILED DESCRIPTION OF THE EMBODIMENTS

In related art, a projection equipment typically includes a housing, a DMD chip, and a DMD circuit board. While in operation, the surface of the DMD chip includes an operational region and a non-operational region. The DMD chip is arranged on the DMD circuit board which is, in turn, connected to the housing via a bolt. The housing is arranged with an opening through which an illumination beam irradiates onto the operational region of the DMD chip.

In a projection equipment of related art, the illumination beam emerges from a housing and irradiates directly onto an imaging element. In an implementation of related art, an illumination beam irradiates a DMD chip to create a light spot whose size needs to be designed by taking the temperature of a non-operational region of the DMD chip and the difficulties in adjusting the dark bands into consideration. Based on the system requirement of the DMD chip, the size of the light spot typically needs to be designed at around 16%, a light spot value which, unfortunately, can cause the system to generate dark bands that are difficult to adjust, making it impossible to suit both considerations at the same time. Hence, in related art, the size of the light spot is typically designed to be larger than 16% to avoid the dark bands that are impossible to adjust. However, due to the expanded size of the light spot irradiated by the illumination beam onto the DMD chip, the illumination beam tend to irradiate into the non-operational region of the DMD chip when radiating onto the operational region. Due to the intensive energy of the illumination beam, over temperature will happen in the non-operational region of the DMD chip when the illumination beam irradiates therein, and extended high temperature will cause epoxy adhesives in the DMD chip to be stratified, allowing water molecules to invade the DMD chip and adhere onto the micro reflection mirrors in the operational region of the DMD chip. This can cause local over temperature in the micro reflection mirrors, leading to invalidation and abnormal operation of the operational region of the DMD chip, and reducing the reliability of the optical device assembly.

With an objective to make the optical device assembly more reliable in use, some embodiments of this disclosure provide a projection equipment which, as depicted in FIGS. 1-7, includes: a housing 105 arranged with a first opening 106 which is configured to allow an illumination beam to pass through and irradiate onto a DMD chip 102; a DMD circuit board 101 arranged with a DMD chip 102 on a side facing the housing 105, wherein the DMD chip 102 is arranged with an operational region 103, a non-operational region 104 and a base pad region 127 (referring to FIG. 7), the non-operational region 104 is located in the periphery of the operational region 103, the base pad region 127 is located in the periphery of the non-operational region 104, and the operational region 103 is configured to modulate a portion of a beam that passes through the first opening 106, wherein the portion of the beam irradiates onto the operational region 103; a first heat dissipation member 107 arranged between the DMD chip 102 and the housing 105 and with a spacing between the first heat dissipation member 107 and the DMD chip 102 (referring to FIG. 4), wherein the first heat dissipation member 107 is arranged with a second opening 109 which is configured to provide a passage for the portion of the beam that passes through the first opening 106 and irradiates onto the operational region 103, while blocking other portion of the beam that passes through the first opening 106, where the beam that passes through the first opening 106 include a first beam and a second beam other than the first beam, where the first beam passes through the second opening 109 and irradiates onto the operational region 103. The blocking other portion of the beam that passes through the first opening 106 may be either blocking all of the other portion of the beam that passes through the first opening 106 (i.e., blocking all of the second beam), or blocking part of the other portion of the beam that passes through the first opening 106 (i.e., blocking part of the second beam). That is, all or part of the second beam is blocked, reducing the beam that irradiate the regions outside of the operational region, decreasing the probability that portions of DMD chip out of the operational region are damaged due to over temperature, thereby enhancing the stability for the DMD chip.

In some embodiments of this disclosure, there is no direct connect between the first heat dissipation member 107 and the DMD chip 102.

The illumination beam passes through a series of lenses, emerges from the first opening 106 on the housing 105, and irradiates onto the first heat dissipation member 107 and the DMD chip 102. The first heat dissipation member 107 can provide a passage to a portion of the beam that passes through the first opening 106, so that they may radiate onto the operational region 103, while blocking all or part of the other portion of beam that passes through the first opening 106. Thus, a portion of the beam that passes through the first opening 106 can pass through the first heat dissipation member 107 and irradiate onto the operational region 103 of the DMD chip 102, while the first heat dissipation member 107 can limit the irradiation range of the beam that passes through the first opening 106 in the non-operational region 104 in the periphery of the operational region 103, which thus can eliminate or reduce the beam that passes through the first opening 106 and irradiate onto the non-operational region 104 of the DMD chip 102, thereby reducing the probability of over temperature at the non-operational region 104 of the DMD chip 102, reducing the probability of the epoxy adhesives in the non-operational region 104 of the DMD chip 102 from being stratified or peeled off, can keeping water molecules out of the DMD chip 102, reducing the probability of invalidation for the DMD chip 102, and improving the reliability for the chip. In some embodiments of this disclosure, the first heat dissipation member 107 includes a main body portion 108, and the second opening 109 is arranged on the main body portion 108. In some embodiments of this disclosure, the main body portion 108 is made of metal, and thus is more heat conductive.

In some embodiments of this disclosure, the second opening 109 of the first heat dissipation member 107 may be adjusted in dimension as needed. For instance, when an interference fit needs to be created for the light spot, the second opening 109 may be appropriately expanded in dimension, so that the dimension of the second opening 109 is slightly larger than that of the operational region 103 of the DMD chip 102. In some other embodiments of this disclosure, the second opening 109 may be located correspondingly to the operational region 103 of the DMD chip 102. The shape and dimension of the second opening 109 may be identical to those of the operational region 103 of the DMD chip 102, so that shape of an irregularly shaped light spot, e.g., a trapezoid or trapeziform light spot, that irradiates onto the operational region 103 of the DMD chip 102 can be defined to only enable a beam with a light spot shaped correspondingly to the shape of the operational region 103 to pass through the second opening 109 and irradiate onto the operational region 103 of the DMD chip 102, thereby preventing dark bands from occurring.

In some other embodiments, because of the spacing between the first heat dissipation member 107 and the DMD chip 102, the second opening 109 may be located correspondingly to the operational region 103 of the DMD chip 102, the second opening 109 may be shaped identically as the operational region 103 of the DMD chip 102, and the second opening 109 may be dimensioned within a predefined tolerance of that of the operational region 103 of the DMD chip 102, reducing the beam that irradiate into the non-operational region.

In some other embodiments, the second opening 109 is shaped identically as the first opening 106.

In some other embodiments, the second opening 109 is dimensioned smaller than the first opening 106. In some other embodiments, a side of the second opening 109 is shorter than a corresponding side of the first opening 106.

Additionally, in some embodiments of this disclosure, the second opening 109 may shade the entire non-operational region 104 of the DMD chip 102, so that all of the beam that passes through the first opening 106 and irradiates onto the periphery of the operational region 103 may be blocked, and thus the beam that passes through the first opening 106 could not irradiate onto the non-operational region 104 of the DMD chip 102.

In some other embodiments of this disclosure, the second opening 109 may shade part of the non-operational region 104 of the DMD chip 102, such as only the part more sensitive to temperature, e.g., the epoxy adhesive enclosure region 126, so that a portion of the beam that passes through the first opening 106 and irradiates onto the periphery of the operational region 103 may be blocked, and thus the portion of the beam that passes through the first opening 106 could not irradiate onto the non-operational region 104 of the DMD chip 102.

Figure 7:
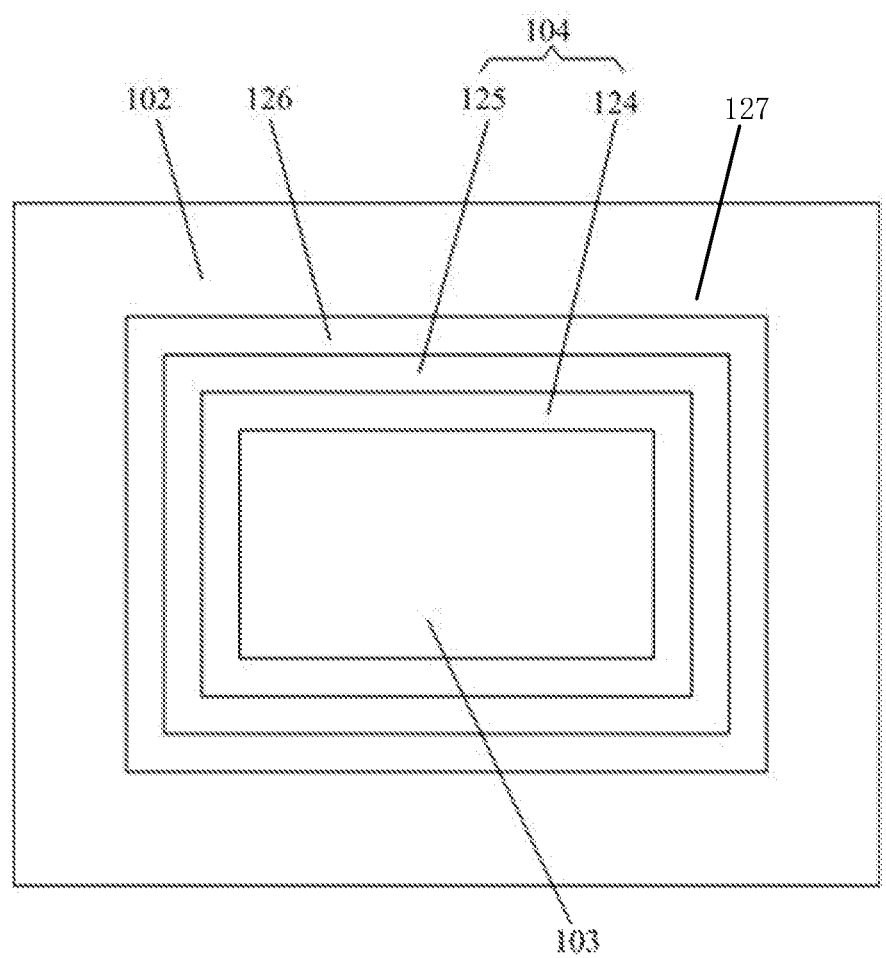
FIG. 7 is a structural view of a DMD chip provided in some embodiments of this disclosure.

As a critical component, the DMD chip 102 has strict requirement with respect to the temperature. Meanwhile, temperature requirements varies for various regions of the DMD chip 102 window. In some other embodiments of this disclosure, as depicted in FIG. 7, the non-operational region 104 of the DMD chip 102 includes a black metallic region 124 and a window region 125, the operational region 103 is located at the middle of the DMD chip 102, the black metallic region 124 is located in the peripheral of the operational region 104, the window region 125 is located in the peripheral of the black metallic region 124, and epoxy adhesive enclosure region 126 of the DMD chip 102 is located in the peripheral of the window region 125. The operational region 104 and black metallic region 124 have efficient heat conductance and dissipation passages. Thus, based on the heat dissipation design, those two regions may be exposed to irradiation by the illumination beam. The window region 125 is not equipped with efficient heat conductance and dissipation passages to enable effective heat dissipation, and is thus more sensitive to extended and direct irradiation by the illumination beam. If over temperature occurs after extended exposure in the illumination beam, the epoxy adhesive enclosure region 126 may be peeled off, leading to invalidation of the operational region of the DMD chip 102. Because of the small size of the black metallic region 124, a conventional illumination design cannot effectively ensure that no beam irradiates onto the window region 125. The projection equipment in some embodiments of this disclosure can effectively prevent the illumination beam from irradiating onto the window region 125 by providing the first heat dissipation member.

Figure 2:
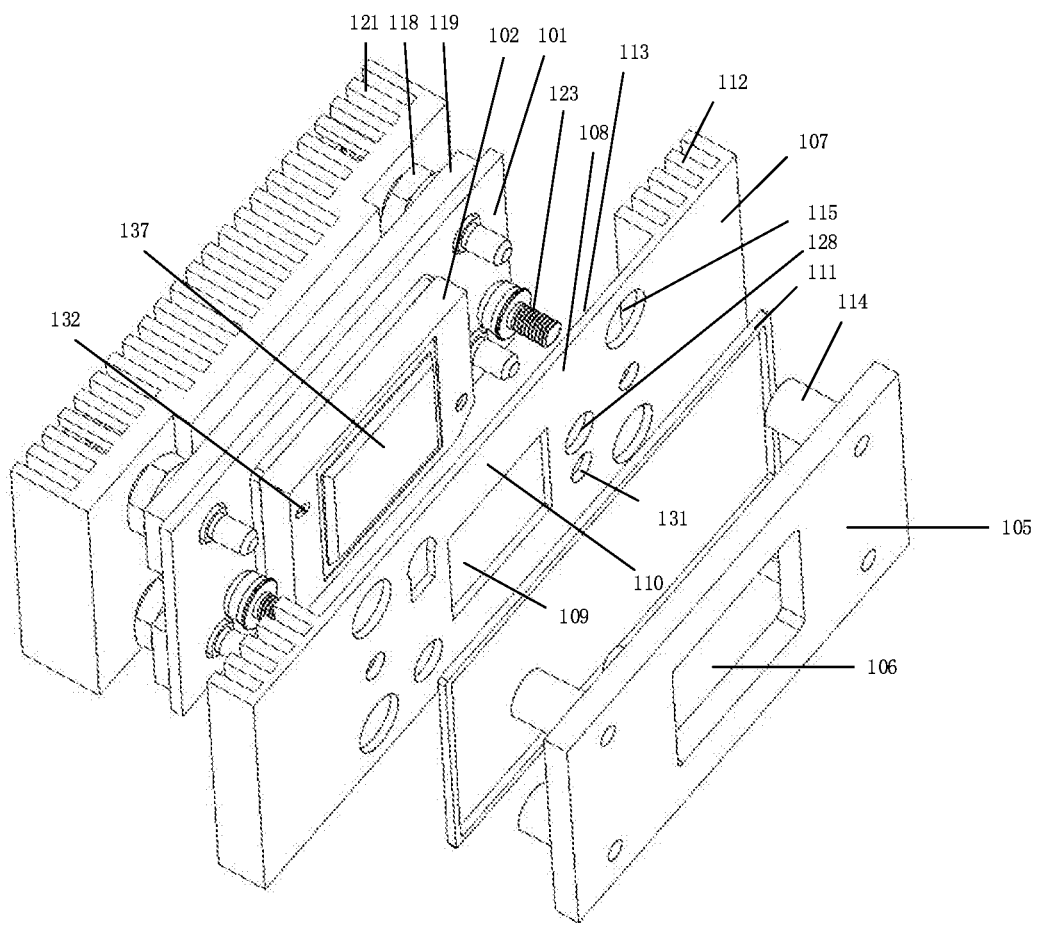
FIG. 2 is a partially assembled structural view of a projection equipment provided in some embodiments of this disclosure.
Figure 3:
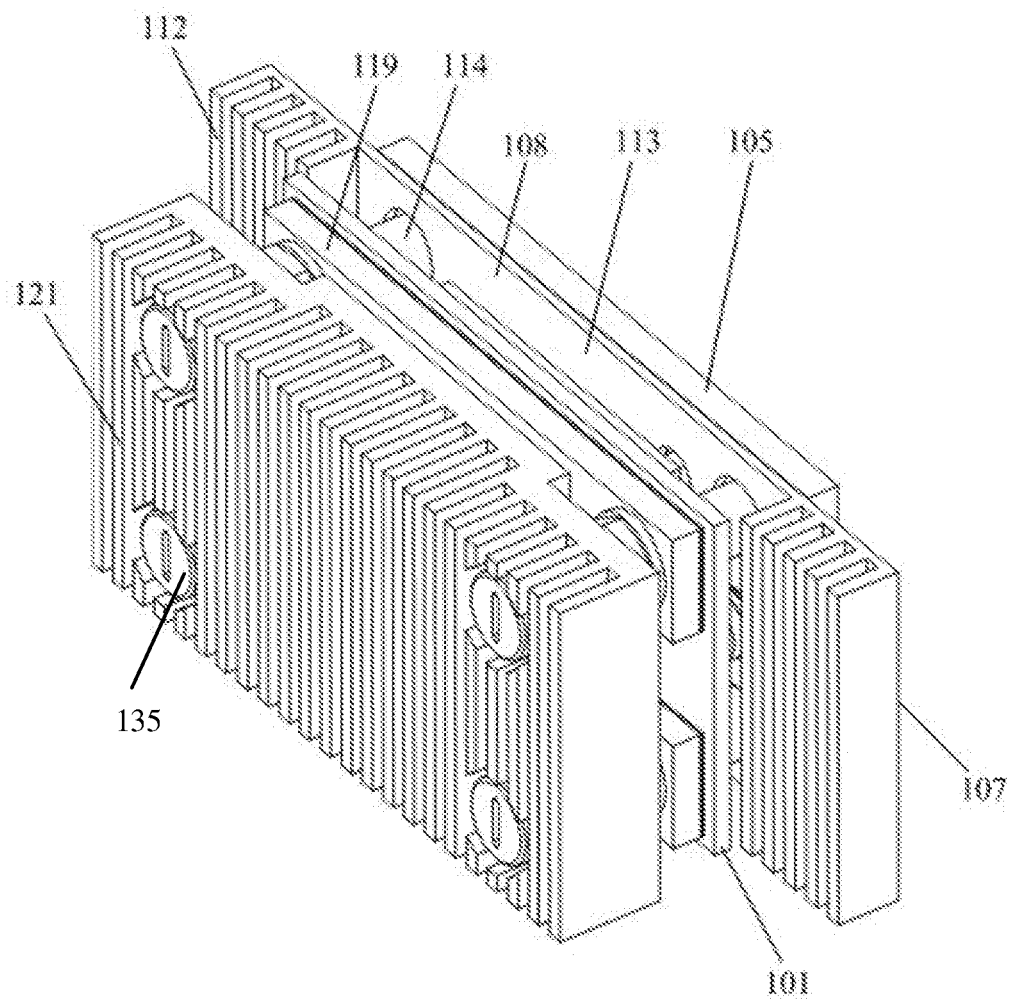
FIG. 3 is an assembled structural view of a projection equipment provided in some embodiments of this disclosure.
Figure 4:
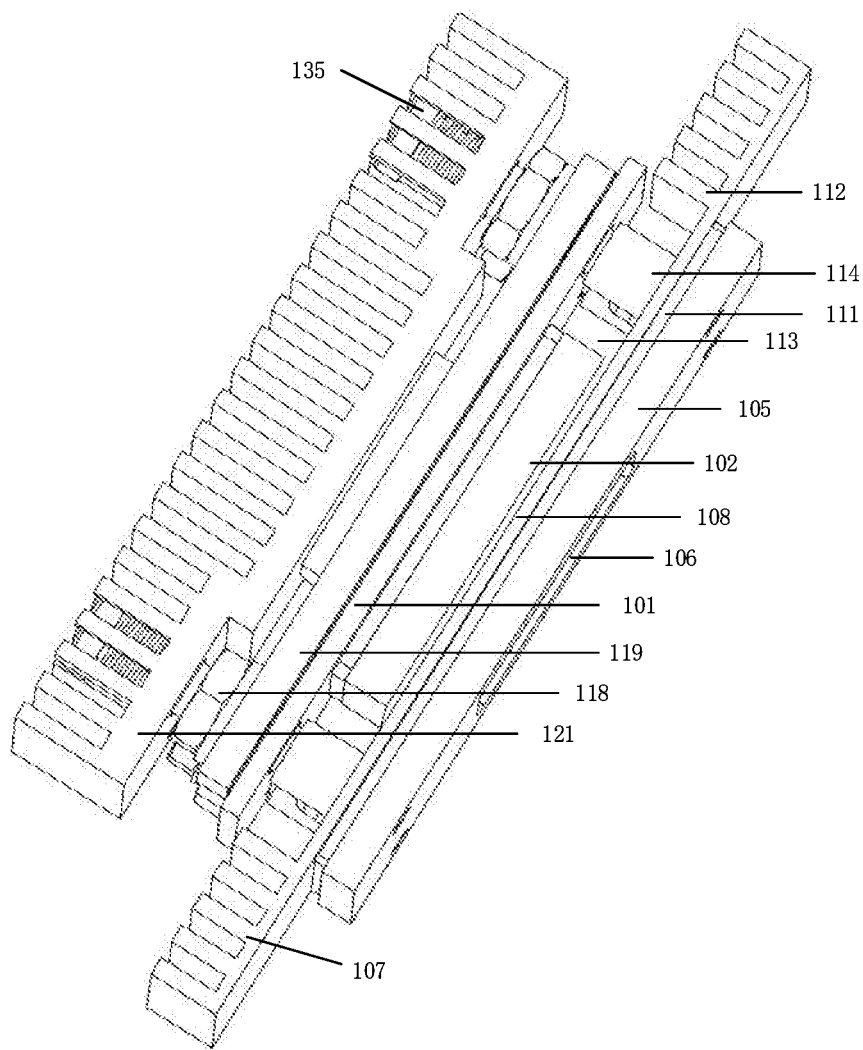
FIG. 4 is another assembled structural view of a projection equipment provided in some embodiments of this disclosure.
Figure 5:
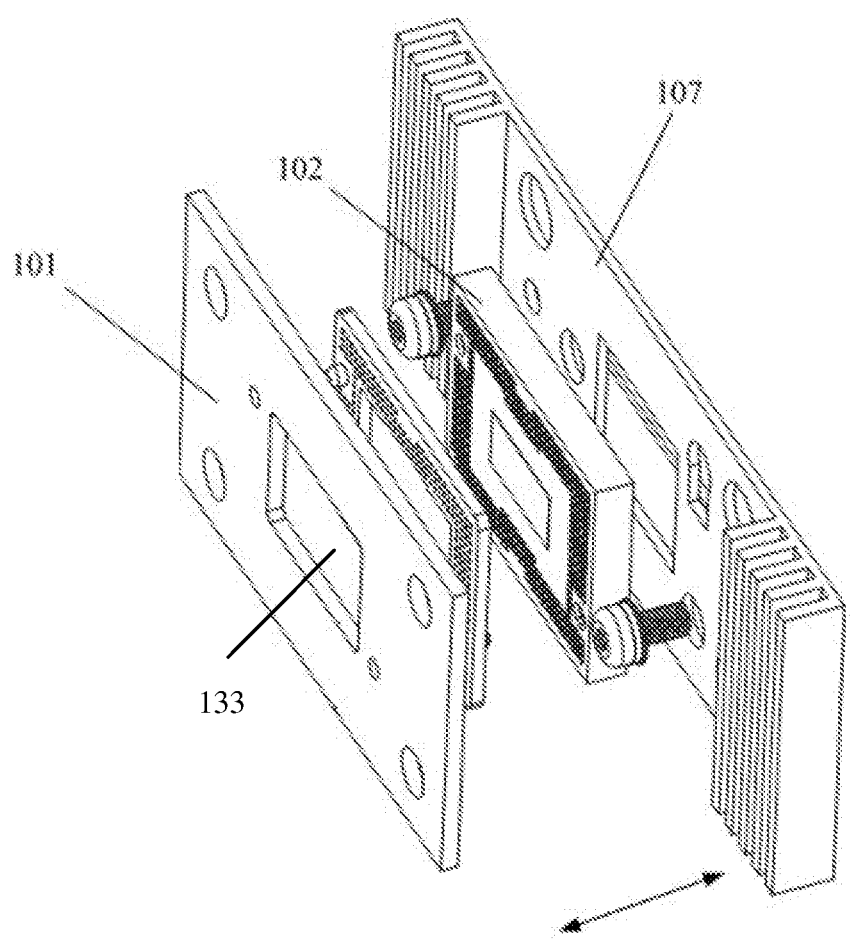
FIG. 5 is a local structural view of a projection equipment provided in some embodiments of this disclosure.
Figure 6:
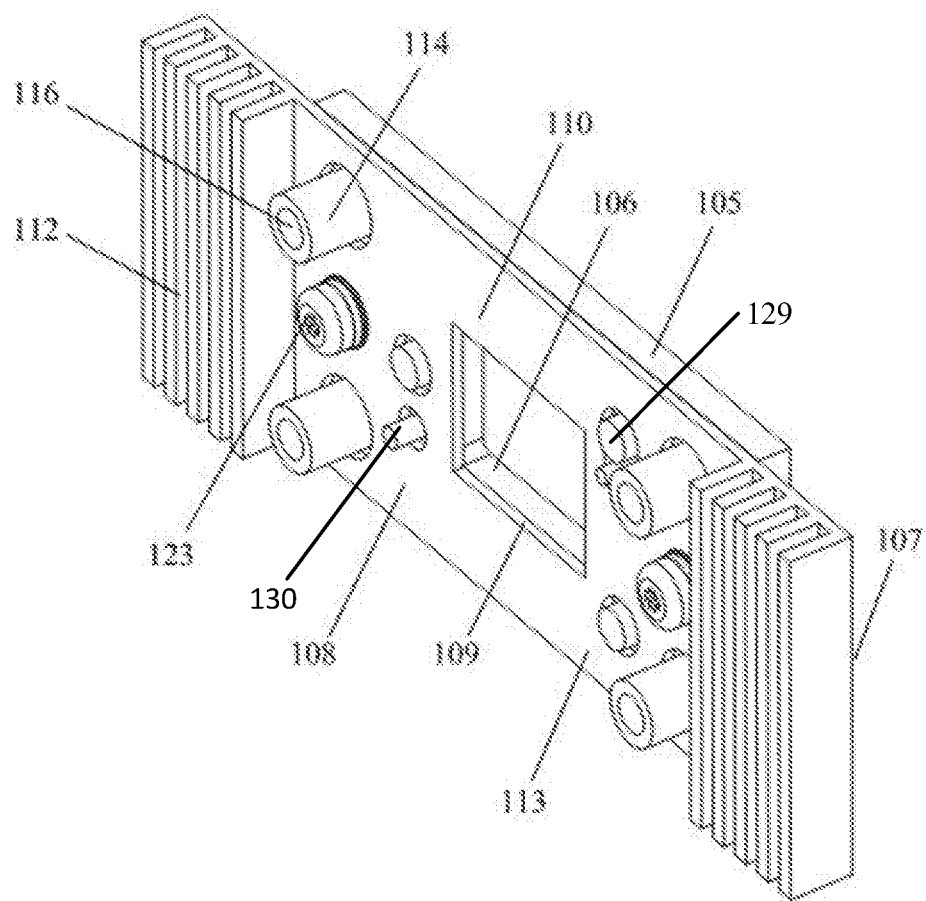
FIG. 6 is another local structural view of a projection equipment provided in some embodiments of this disclosure.

In some embodiments of this disclosure, as depicted in FIGS. 2 and 6, the housing 105 is further provided with a first strut 129, the first heat dissipation member 107 is further provided with a first through-hole 128, the first strut 129 passes through the first through-hole 128 and abuts against the base pad region 127 of the DMD chip 102 to form the spacing.

In some embodiments of this disclosure, the first strut 129 has a diameter that is smaller than that of the first through-hole 128.

Thus, because the first heat dissipation member 107 is provided between the DMD chip 102 and the housing 105, the beam will also irradiate onto the main body portion 108 when irradiating onto the DMD chip 102 operational region 103, causing temperature rise of the first heat dissipation member 107. Because the first strut 129 has a smaller diameter than the first through-hole 128, heat at the first heat dissipation member 107 will not be transferred to the DMD chip 102, thus avoiding temperature rise of the DMD chip 102, preventing invalidation of the DMD chip 102 due to overheating, and further improving the operational reliability of the projection equipment.

In some embodiments of this disclosure, there are three first struts 129 that, when joined by straight lines, may form a triangle.

In some embodiments of this disclosure, the housing 105 is further provided with a locater strut 130, the first heat dissipation member 107 is further provided with a second through-hole 131, the base pad region 127 of the DMD chip 102 is further provided with a locater strut receiving groove 132. The locater strut 130 passes through the second through-hole 131 and is received by the locater strut receiving groove 132, thus locating the DMD chip 102 and housing 105.

In some embodiments of this disclosure, the locater strut 130 has a diameter that is smaller than that of the second through-hole 131.

Thus, because the first heat dissipation member 107 is provided between the DMD chip 102 and the housing 105, the beam will also irradiate onto the main body portion 108, i.e., the first heat dissipation member 107, when irradiating onto the DMD chip 102 operational region 103, causing temperature rise of the first heat dissipation member 107. Because the locater strut 130 has a smaller diameter than the second through-hole 131, heat at the first heat dissipation member 107 will not be transferred to the DMD chip 102, thus avoiding temperature rise of the DMD chip 102, preventing invalidation of the DMD chip 102 due to overheating, and further improving the operational reliability of the projection equipment.

In some other embodiments, a blocking portion 110 is provided in a region surrounding the second opening 109 on the main body portion 108. The second beam irradiates on a side of the blocking portion 110 facing the first opening 106.

In some embodiments of this disclosure, the locater strut 130 may have a diameter that corresponds to that of the locater strut receiving groove 132, thus providing improved locating for the DMD chip 102 and housing 105.

There are two locater strut receiving groove arranged along the diagonal of the base pad region of the DMD chip, robustly locating the DMD chip 102 and housing 105.

In some embodiments of this disclosure, the DMD assembly further includes a heat insulation member 111 which is sandwiched between the first heat dissipation member 107 and housing 105.

Thus, because the first heat dissipation member 107 is provided between the DMD chip 102 and the housing 105, the beam will also irradiate onto the main body portion 108 when irradiating onto the DMD chip 102 operational region 103, causing temperature rise of the first heat dissipation member 107. Because the heat insulation member 111 is sandwiched between the first heat dissipation member 107 and housing 105, heat transfer between the first heat dissipation member 107 and housing 105 may be intercepted, preventing heat transfer from the first heat dissipation member 107 to the housing 105, thus avoiding negative effects resulting from the temperature rise of the housing 105. The housing 105, which is typically made of metal, is well conductive to heat, allowing the heat to be passed on to other components easily. Without the heat insulation member 111 between the first heat dissipation member 107 and housing 105, the heat will spread out rather than concentrated for rapid dissipation. On the other hand, heat transferred to other components of the housing may interfere with other structures. For example, the lens can encounter thermal drift brought about by the temperature rise of the housing.

In some embodiments of this disclosure, the first heat dissipation member 107 further includes heat dissipation portion 112, which is connected with the main body portion 108. The main body portion 108 and the heat dissipation portion 112 may be integrally formed, or connected by a connection means, such as rivets or screws.

Thus, because the first heat dissipation member 107 is provided between the DMD chip 102 and the housing 105, the beam will also irradiate onto the main body portion 108 when irradiating onto the DMD chip 102 operational region 103, causing temperature rise of the first heat dissipation member 107. Because the heat dissipation portion 112 is connected with the main body portion 108, heat in the main body portion 108 may be transferred to the heat dissipation portion 112 for dispersion, thereby improving heat dissipation performance of the first heat dissipation member 107.

In some embodiments of this disclosure, the heat dissipation portion 112 is a cooling fin.

Thus, because the first heat dissipation member 107 is provided between the DMD chip 102 and the housing 105, the beam will also irradiate onto the main body portion 108 when irradiating onto the DMD chip 102 operational region 103, causing temperature to rise of the first heat dissipation member 107. Because the cooling fin is connected with the main body portion 108, heat in the main body portion 108 may be transferred to the cooling fin for dispersion. Because of the improved heat dissipation capacity, which facilitates more rapid heat dispersion, heat dissipation performance of the first heat dissipation member 107 may be improved further.

In some embodiments of this disclosure, the cooling fin may be made entirely of aluminum. In some other embodiments of this disclosure, the cooling fin may be made of a material that consists of 50% aluminum and 50% copper.

In some embodiments of this disclosure, the first heat dissipation member 107 includes a plurality of heat dissipation portions 112, and the main body portion 108 is located between the plurality of heat dissipation portions 112. The number of the heat dissipation portions 112 may be set according to the demand for heat dissipation or the volume of the space surrounding the assembly. In some embodiments of this disclosure, there are two heat dissipation portions 112, with the main body portion 108 being sandwiched between the two heat dissipation portions 112. In some other embodiments of this disclosure, there are more than two heat dissipation portions 112 provided around the main body portion 108.

Thus, because the first heat dissipation member 107 is provided between the DMD chip 102 and the housing 105, the beam will also irradiate onto the main body portion 108 when irradiating onto the DMD chip 102 operational region 103, causing temperature to rise of the first heat dissipation member 107. Because the heat dissipation portion 112 is connected with the main body portion 108 that is, in turn, located between the plurality of the heat dissipation portions 112, heat in the main body portion 108 may be respectively transferred from the main body portion 108 to the plurality of heat dissipation portions 112 for dispersion, which can advantageously accelerate the rate of heat dispersion, thereby improving heat dissipation performance of the first heat dissipation member 107.

In some embodiments of this disclosure, an accommodation portion 113 is formed between the plurality of heat dissipation portions 112. The accommodation portion 113 refers to a concave space formed between a side of the heat dissipation portion 112 away from the housing and a side of the main body portion 108 away from the housing because the side of the heat dissipation portion 112 away from the housing is more distant from the plane where the first opening is located than the side of the main body portion 108 away from the housing. The DMD circuit board 101 is accommodated within the accommodation portion 113. This is advantageous in reducing the thickness of the projection equipment, further compacting the projection equipment.

In some embodiments of this disclosure, the first heat dissipation member 107 is fixed onto the housing 105 by a fastening bolt 123.

This is advantageous in improving the reliability of the connection between the first heat dissipation member 107 and the housing 105.

In some embodiments of this disclosure, the housing 105 is provided with a second support strut 114 that is, in turn, provided with a first bolt hole 116. The main body portion 108 is further provided with a third through-hole 115. The DMD circuit board 101 is provided with a fourth through-hole 117. The second support strut 114 runs through the third through-hole 115 and abuts against the DMD circuit board 101, such that there is a predetermined distance between the DMD circuit board 101 and the first heat dissipation member 107. The first connection bolt 118 runs through the fourth through-hole 117 and is connected with the second support strut 114 via the first bolt hole 116, so that the DMD circuit board 101, first heat dissipation member 107 and housing 105 may be joined together.

Thus, because the first heat dissipation member 107 is provided between the DMD chip 102 and the housing 105, the beam will also irradiate onto the main body portion 108 when irradiating onto the DMD chip 102 operational region 103, causing temperature rise of the first heat dissipation member 107. Because the second support strut 114 runs through the third through-hole 115 and abuts against the DMD circuit board 101 to create the predetermined distance between the DMD circuit board 101 and the first heat dissipation member 107, heat in the first heat dissipation member 107 will not be transferred to the DMD circuit board 101 and DMD chip 102, thereby avoiding temperature rise of the DMD circuit board 101 and DMD chip 102, preventing invalidation of the DMD circuit board 101 and DMD chip 102 due to overheating, and further improving the operational reliability of the optical device.

In some embodiments of this disclosure, the DMD circuit board 101 is connected with the DMD chip 102 by a contact pin or a point contact. When being mounted, the DMD circuit board 101 is susceptible to deformation if under load, which can distort the contact surface with the DMD chip 102, leading to poor contact with the DMD chip 102. Hence, the projection device may further include a connection plate 119 provided at a side of the DMD circuit board 101 away from the housing 105. The connection plate 119 is provided with a fifth through-hole 120. The first connection bolt 118 successively runs through the fifth through-hole 120, fourth through-hole 117 and is connected with the second support strut 114 via the first bolt hole 116, so that the connection plate 119, DMD circuit board 101, first heat dissipation member 107 and housing 105 may be joined together.

With its rigidity, the connection plate 119 is more resilient to deformation when under load. When tightened, the first connection bolt 118 will apply its pressure directly onto the connection plate 119 instead of the DMD circuit board 101, thereby contributing protection to, and preventing the deformation of the DMD circuit board 101. Meanwhile, connections can also be more reliable between the DMD circuit board 101, first heat dissipation member 107 and housing 105.

In some embodiments of this disclosure, the DMD assembly further includes a second heat dissipation member 121 provided on a side of the connection plate 119 away from the DMD circuit board 101, and provided with a sixth through-hole 134. The first connection bolt 118 is provided at its head a second bolt hole 136. The second connection bolt 135 runs through the sixth through-hole 134 and is connected with the first connection bolt 118 via the second bolt hole 136, so that the second heat dissipation member 121, connection plate 119, DMD circuit board 101, first heat dissipation member 107 and housing 105 may be joined together.

In some embodiments of this disclosure, the second heat dissipation member 121 is provided with a heat conduction block 137, the connection plate 119 is provided with a seventh through-hole 122, the DMD circuit board 101 is provided with an eighth through-hole 133, and the heat conduction block 137 successively runs through the seventh through-hole 122 and eighth through-hole 133 and then abuts against the DMD chip 102.

Thus, heat generated by the DMD chip 102 during operation may be rapidly conducted via the heat conduction block 137 to the second heat dissipation member 121, facilitating heat dissipation of the DMD chip 102. The heat conduction block 137 may abut against the DMD chip 102 via a thermal conductive paste.

In some embodiments of this disclosure, the second heat dissipation member 121 includes a heat sink, which may be a cooling fin.

Finally, it should be noted that the foregoing embodiments are merely intended for describing, rather than limiting, the technical solutions of the present disclosure. Although the present disclosure is described in detail with reference to the foregoing embodiments, a person skilled in the art should understand that it remains possible to make modifications to the technical solutions described in the foregoing embodiments, or make equivalent replacements to some or all technical features therein. However, these modifications or replacements do not make the essence of corresponding technical solutions depart from the scope of the technical solutions in the embodiments of the present disclosure.

What is claimed is:

1. A projection equipment, comprising: a housing arranged with a first opening, a DMD circuit board with a DMD chip located on a side of the DMD circuit board facing the housing, wherein the DMD chip includes an operational region and a non-operational region, the non-operational region being located in a periphery of the operational region, and the operational region being configured to modulate a first portion of a beam that passes through the first opening when the first portion of the beam irradiates onto the operational region: and a first heat dissipation member arranged between the DMD chip and the housing, wherein the first heat dissipation member is spaced from the DMD chip, wherein the first heat dissipation member is arranged with a second opening configured to provide a passage for the first portion of the beam that passes through the first opening and irradiates onto the operational region and to block a second portion of the beam that passes through the first opening, wherein the housing includes a first strut, wherein the first heat dissipation member includes a first through-hole, wherein the DMD chip includes a base pad region located in a periphery of the non-operational region, and wherein the first strut passes through the first through-hole and abuts the base pad region of the DMD chip to form a space between the first heat dissipation member and the DMD chip.

2. The projection equipment according to claim 1, wherein the first strut has a diameter that is smaller than a diameter of the first through-hole.

3. The projection equipment according to claim 1, wherein a second strut and a third strut are included, and wherein the first strut, the second strut, and the third strut are arranged in a triangle.

4. The projection equipment according to claim 1, wherein the housing includes a locater strut, wherein the first heat dissipation member includes a second through-hole, wherein the DMD chip includes the base pad region which is located in the periphery of the non-operational region, wherein the base pad region of the DMD chip includes a locater strut receiving groove, and wherein the locater strut passes through the second through-hole and is received by the locater strut receiving groove to position the DMD chip and housing.

5. The projection equipment according to claim 4, wherein the locater strut has a diameter that is smaller than a diameter of the second through-hole, and wherein the diameter of the locater strut corresponds to a diameter of the locater strut receiving groove.

6. The projection equipment according to claim 4, wherein the base pad region includes a second locater strut receiving groove, and wherein the first locater strut receiving groove and the second locater strut receiving groove are arranged diagonally along the base mad region of the DMD chip.

7. The projection equipment according to claim 1, wherein the first heat dissipation member includes a main body portion, and wherein the second opening is located on the main body portion.

8. The projection equipment according to claim 1, wherein the second opening has a shape that corresponds to a shape of the operational region.

9. The projection equipment according to claim 1, further comprising a heat insulation member which is located between the first heat dissipation member and the housing.

10. The projection equipment according to claim 1, wherein the first heat dissipation member further comprises a heat dissipation portion connected to the main body portion.

11. The projection equipment according to claim 10, wherein the main body portion and the heat dissipation portion are integrally formed.

12. The projection equipment according to claim 10, wherein the first heat dissipation member comprises a plurality of heat dissipation portions, and wherein the main body portion is located between at least two of the heat dissipation portions.

13. The projection equipment according to claim 12, wherein:
at least one heat dissipation portion is located on each end of the main body portion.

14. The projection equipment according to claim 12, wherein an accommodation portion is formed between the plurality of heat dissipation portions, and wherein the DMD circuit board is accommodated within the accommodation portion.

15. The projection equipment according to claim 1, wherein the housing includes a second support strut that has a first bolt hole, wherein the main body portion has a third through-hole, wherein the DMD circuit board has a fourth through-hole, wherein the second support strut extends through the third through-hole and abuts against the DMD circuit board, and wherein a first connection bolt extends through the fourth through-hole and is connected to the second support strut via the first bolt hole such that the DMD circuit board, the first heat dissipation member, and the housing are joined together.

16. The projection equipment according to claim 15, further comprising: a connection plate located on a second side of the DMD circuit board, the second side facing away from the housing, wherein the connection plate includes a fifth through-hole, wherein the first connection bolt successively extends through the fifth through-hole and the fourth through-hole and is connected to the second support strut via the first bolt hole such that the connection plate, the DMD circuit board, the first heat dissipation member, and the housing are joined together.

17. The projection equipment according to claim 16, further comprising: a second heat dissipation member located on a side of the connection plate facing away from the DMD circuit board, the second heat dissipation member include a sixth through-hole, wherein the first connection bolt is includes a second bolt hole at its head, and wherein the second connection bolt runs through the sixth through-hole and is connected with the first connection bolt via the second bolt hole such that the second heat dissipation member, the connection plate, the DMD circuit board, the first heat dissipation member, and the housing are joined together.

18. The projection equipment according to claim 17, wherein the second heat dissipation member includes a heat conduction block, wherein the connection plate includes a seventh through-hole, wherein the DMD circuit board includes eighth through-hole, and wherein the heat conduction block successively runs through the seventh through-hole and eighth through-hole and then abuts against the DMD chip.

19. The projection equipment according to claim 17, wherein the second heat dissipation member includes a heat sink with at least one cooling fin.

20. A projection equipment, comprising: a housing arranged with a first opening; a DMD circuit board with a DMD chip located on a side of the DMD circuit board facing the housing, wherein the DMD chip includes an operational region and a non-operational region, the non-operational region being located in a periphery of the operational region, and the operational region being configured to modulate a first portion of a beam that passes through the first opening when the first portion of the beam irradiates onto the operational region; and a first heat dissipation member arranged between the DMD chip and the housing, wherein the first heat dissipation member is spaced from the DMD chip, wherein the first heat dissipation member is arranged with a second opening configured to provide a passage for the first portion of the beam that passes through the first opening and irradiates onto the operational region and to block a second portion of the beam that passes through the first opening, wherein the housing includes a locater strut, wherein the first heat dissipation member includes a through-hole, wherein the DMD chip includes a base pad region which is located in a periphery of the non-operational region, wherein the base pad region of the DMD chip includes a locater strut receiving groove, and wherein the locater strut passes through the through-hole and is received by the locater strut receiving groove to position the DMD chip and housing.

* * * * *